(No Model.)

C. O. EHLERT.
CONDUIT CLEANING DEVICE.

No. 524,434. Patented Aug. 14, 1894.

Witnesses:
H. Fischer
L. H. Richards

Inventor:
Chas. O. Ehlert

UNITED STATES PATENT OFFICE.

CHARLES O. EHLERT, OF NEW YORK, N. Y.

CONDUIT-CLEANING DEVICE.

SPECIFICATION forming part of Letters Patent No. 524,434, dated August 14, 1894.

Application filed August 22, 1893. Serial No. 483,786. (No model.)

*To all whom it may concern:*

Be it known that I, CHARLES O. EHLERT, of the city, county, and State of New York, have invented an Improvement in Electric Railways, of which the following is a specification.

My invention has reference to the sweeping or cleaning of under ground conduits suitable for electric railways and consists of certain improvements which are fully set forth in the following specification and shown in accompanying drawings which form a part thereof.

It is well known that under ground conduits suitable for electric railways having a continuous longitudinal open slot are apt to become filled with mud, &c., entering said slot, moreover mud that has entered slot into conduit may dam up water within said conduit and prevent said water from readily draining off and otherwise cause leakage of the electric current. The object of my invention is to obviate these difficulties by constructing a cleaning or sweeping device attached or secured to an electrically propelled vehicle, consisting of one or more sweeping brushes or brooms pivoted to range longitudinally suspended within the conduit from points upon the car, remote from each other, and connected thereto by self adjusting connections, to sweep all mud, &c., found therein into vaults placed along the said conduit at suitable distances apart. The said conduit can be swept as often as desired, preferably during night or period of least traffic, and the mud receiving vaults, being of sufficient size, may be cleaned whenever they become filled up. Thus the mud, &c., entering said slot of conduit is prevented from accumulating within said conduit and water entering through said slot has good drainage and can readily flow off out of conduit.

To this end my invention consists of certain features of construction and combination of parts which will be hereinafter fully described and then pointed out in the claims, reference being had to accompanying drawings.

Figure 1:
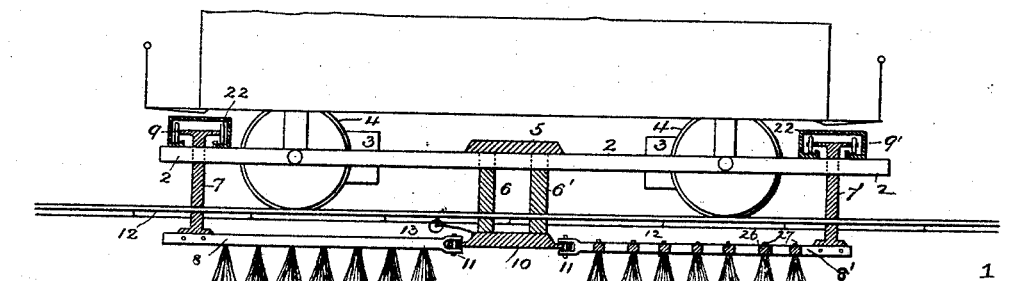
Figure 2:
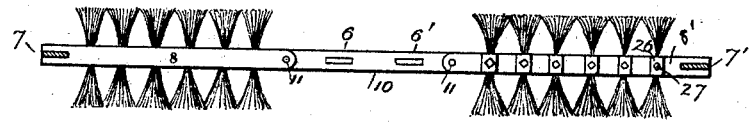
Figure 3:
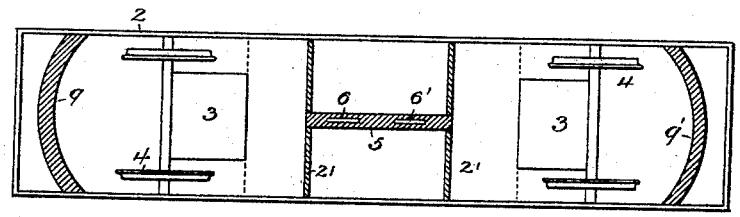
Figure 4:
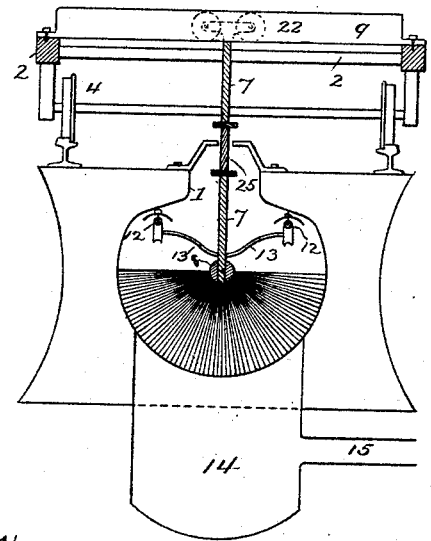

Figure 1 is an elevation of conduit sweeping device mounted on the truck or body of an electrically propelled vehicle. Fig. 2 is a plan view of sweeping brushes or brooms pivoted or coupled to range longitudinally within the conduit. Fig. 3 is a plan view of the brush supporting or suspending mechanism mounted on the truck of an electrically propelled vehicle adapted to move above a slotted conduit. Fig. 4 is a cross section of the truck of an electrically propelled vehicle adapted to move above a slotted conduit, and the sweeping brushes or brooms suspended from said vehicle within said conduit.

1 is an underground conduit suitable for electric railways, having an open longitudinal slot.

2. is a truck of an electrically propelled vehicle or car.

3 are electric motors mounted on truck 2 of an electrically propelled vehicle, said motors receiving current from the electric conductors 12 by means of a suitable current collector 13. 4 are wheels on which said truck 2 is mounted.

5. is a suitable cross piece or support secured upon truck 2 by means of cross arms 21, to this cross piece or support 5 is secured the brush supporting or suspending rods 6, 6'. and are extended from said cross piece 5 downward, through the longitudinal slot and within conduit and are secured at their lower ends to a base or foot 10. The sweeping brushes or brooms 8, 8' are pivoted or coupled to range longitudinally within said conduit upon the said base or foot 10 at the pivots 11 in a manner to allow or permit the said sweeping brushes to swing or move upon the said pivots 11 when passing curved sections of the conduit. The said sweeping brushes or brooms are composed of a shaft or rod 8 to hold bunches of bristles. The ends of said brush shafts or frames are pivoted or coupled as above described. Although only one brush or broom is shown pivoted on each side of base or foot 10, other brushes may be pivoted upon the ends of brushes shown and the guide rods or arms 7, 7' are then removed and secured to the free or uncoupled ends of the second brush. The guide rods or arms 7, 7' are secured at their lower ends within the said conduit to the free or uncoupled ends of said sweeping brushes or brush shafts and are extended upward through and above the longitudinal slot of said conduit 1 and are supported at their upper ends above the conduit to the truck 2 of an electrically propelled vehicle, in a manner to permit the said guide rods or arms 7, 7' to move or swing easily and freely to one side or the other as the case may be, when passing curved sections of the conduit. The said guide rods or arms 7, 7' being extended through the longitudinal slot of said conduit, have their movements directed by the said slot, when passing straight sections of the conduit the guide rods or arms are not moved and thus the sweeping brushes or brooms are kept parallel with the conduit but in passing curved sections of the conduit the said guide rods or arms are moved or pressed to one side or the other by the curved open slot of said conduit thus causing the said longitudinally pivoted or coupled sweeping brushes to be adjusted to the curved sections of said conduit. As shown in Fig 1 the upper ends of said guide rods or arms 7, 7' are mounted on small trolley wheels 22 adapted to move or turn within a curved groove or track 9 which is secured upon each end of the truck 2 thus permitting the said guide rods or arms 7, 7' to move or swing when so caused by the open slot of conduit. If desired the said guide rods or arms 7, 7' may be suspended from the car by self adjusting sliding connections in the place of the self adjusting rolling connections above described.

14 are mud receiving vaults with drain pipes 15.

In some cases a trailing car or vehicle fitted with the within described conduit sweeper or cleaner, may be attached to an electrically propelled vehicle also having the within described conduit sweeper to facilitate the cleaning of the slotted underground conduit.

I do not limit myself to the mere details of construction as they may be modified in various ways without departing from the principle of my invention.

Having thus fully described my invention, what I claim as new, and desire to secure by Letters Patent, is—

1. A device or apparatus for cleaning or sweeping the interior of slotted underground conduits suitable for electric railways, carried by an electrically propelled vehicle adapted to move above said conduits, consisting of one or more sweeping brushes or brooms suspended within the conduit from points upon the car, remote from each other, and connected thereto by self adjusting connections whereby the said sweeping brushes or brooms are or can be adjusted to curved sections of said conduit substantially as shown and described.

2. A device or apparatus for sweeping or cleaning the interior of slotted underground conduits suitable for electric railways, carried by an electrically propelled vehicle adapted to move above said conduit, and consisting essentially of one or more brooms pivoted to range longitudinally, suspended within said conduit from said vehicle, and having their unpivoted ends connected to points upon said vehicle, remote from each other, by self adjusting connections whereby the said sweeping brushes or brooms are adjusted to curved sections of said conduit substantially as shown and described.

3. In an electric railway, a device or apparatus for sweeping the interior of slotted underground conduits, carried by an electrically propelled vehicle adapted to move above said conduits, consisting of a brush supporting mechanism secured to said vehicle and extended within said conduit, one or more sweeping brushes or brooms pivoted to range longitudinally within said conduit upon said brush supporting mechanism, and guide rods or arms secured to the free or unpivoted ends of said sweeping brushes or brooms and extended upward through and above the longitudinal slot of said conduit, and connected at their upper ends to points upon said vehicle or car, remote from each other, by self-adjusting connections in a manner to permit them to swing easily and freely, as and for the purpose specified.

4. In an electric railway, a slotted conduit arranged along a railway, an electrically propelled vehicle receiving current from suitable electric conductors secured within said conduit, and a conduit sweeping device or apparatus carried by said vehicle, consisting of one or more sweeping brushes or brooms pivoted to range longitudinally suspended within said conduit from said vehicle and a brush or broom adjusting mechanism carried by said vehicle and engaging with said sweeping brushes whereby the said sweeping brushes or brooms are adjusted to curved sections of said conduit, substantially as shown and described.

5. In a device or apparatus for sweeping the interior of slotted underground conduits suitable for electric railways, the combination with an electrically propelled vehicle, of a number of sweeping brooms or brushes suspended from said vehicle within said conduit and pivoted or coupled to range longitudinally therein and of guide rods 7, 7' secured to the free or unpivoted ends of said brushes and extended upward through and above slot of conduit and connected to points upon said vehicle or car, remote from each other, by self adjusting connections substantially as shown and described.

6. In an electric railway having a slotted underground conduit, the combination with an electrically propelled vehicle adapted to move above said conduit, of a brush suspending or supporting mechanism secured to said vehicle and extended within said conduit, of the pivoted or coupled sweeping brushes or brooms 8, 8' suspended within said conduit and pivoted at one end upon the said brush suspending mechanism, of the guide rods or arms 7, 7' secured at their lower ends to the free or unpivoted ends of said brushes and extended upward through and above slot of said conduit, and means whereby the said guide rods or arms 7, 7' are supported at their upper ends to points upon the said car or vehicle, remote from each other, in a manner to permit them to adjust the said sweeping brushes to curves of said conduit substantially as shown and described.

7. In a device or apparatus for sweeping the interior of a slotted underground conduit suitable for electric railways, carried by an electrically propelled vehicle adapted to move above said conduit, the combination of the sweeping brushes 8, 8' suitably suspended from said vehicle within said conduit and pivoted to range longitudinally therein, of the guide rods or arms 7, 7' engaging with the free or unpivoted ends of said brushes and extending upward, through, and above slot of conduit, and of suitable self-adjusting connections secured upon said vehicle at points remote from each other, and engaging with the upper ends of said guide rods 7, 7' in a manner as and for the purpose specified.

In testimony whereof I have hereunto subscribed my name this 19th day of August, A.D. 1893.

CHAS. O. EHLERT.

Witnesses:
K. FISCHER,
L. H. RICHARDS.